C. I. Fisher.

Horse Collar

No. 89,646.  Patented May 4, 1869.

Witnesses,

Inventor,
C. I. Fisher
per Munn & Co.
Attorneys

C. J. FISHER, OF WAUKON, IOWA.

Letters Patent No. 89,646, dated May 4, 1869.

IMPROVED NECK-PAD FOR HORSES.

The Schedule referred to in these Letters Patent and making part of the same.

*To all whom it may concern:*

Be it known that I, C. J. FISHER, of Waukon, in the county of Allamakee, and State of Iowa, have invented a new and improved Neck-Pad for Horses; and I do hereby declare that the following is a full, clear, and exact description thereof, which will enable others skilled in the art to make and use the same, reference being had to the accompanying drawings forming part of this specification, in which—

Similar letters of reference indicate corresponding parts.

Figure 1:
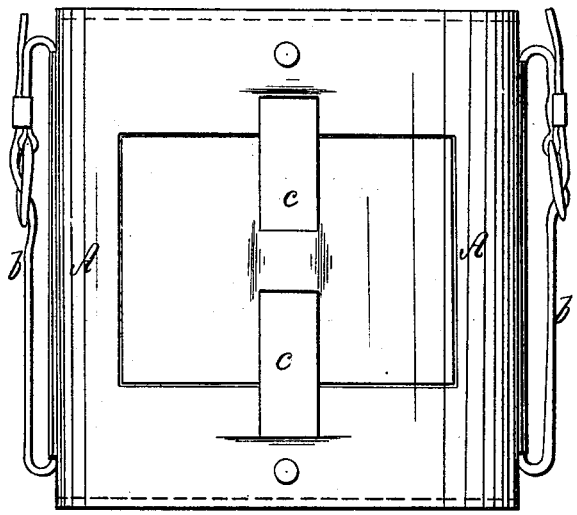
Figure 1 represents a plan or top view of my improved neck-pad.

This invention relates to a new device for protecting the necks of horses between the upper ends of the collar to prevent galling. For this purpose pieces of leather, cloth, or other material have heretofore been used, but without the desired success. Pads could not be made, as their inner faces could not be kept clear from wrinkles or protuberances, which are more injurious than the omission of a protecting device.

My invention consists in producing a pad which may be attached to the collar, and which is perfectly smooth on the under side, the leather used on the under side being crimped in order to obtain the desired shape.

A, in the drawing, represents the pad. It is so shaped that it fits a horse's neck between the arms of the collar, it being thick on top and tapering toward the ends, as is clearly shown in fig. 2.

The under side of the pad is formed by a sheet of leather $a$, which is crimped in order to have its ends turned up without producing wrinkles; the stuffing in the pad is of hay, or any other suitable material.

Figure 2:
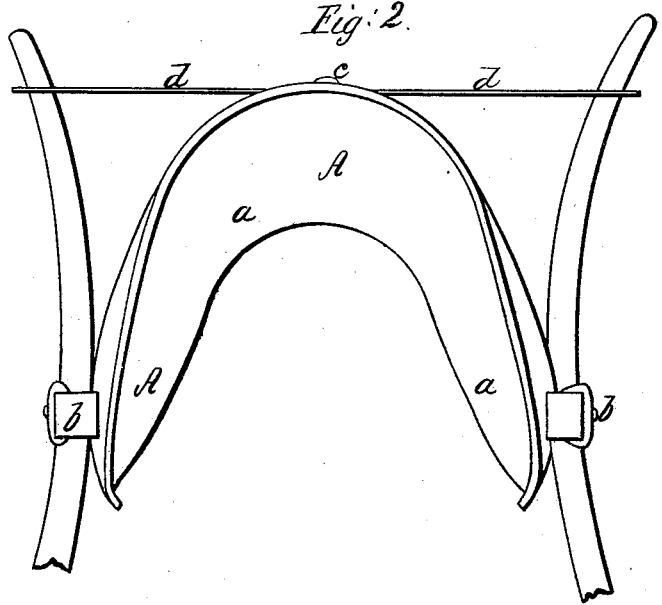
Figure 2 is an edge view of the same.

On the outer side of the pad, near the ends of the same, are straps $b\ b$, which are fitted around the collar as indicated in fig. 2, to prevent longitudinal displacement of the pad.

On top of the pad is arranged a strap $c$, under which the end straps $d\ d$ of the collar may be passed, as in fig. 2, to prevent upward displacement of the pad.

I claim as new, and desire to secure by Letters Patent, as an article of manufacture—

The neck-pad, having an inner lining of crimped leather, and provided with straps $b\ c$, to allow its being fastened to the collar, as herein shown and described for the purpose specified.

C. J. FISHER.

Witnesses:
 L. O. BEARCE,
 A. J. RODGERS.